US011410132B2

(12) United States Patent
Schmid et al.

(10) Patent No.: US 11,410,132 B2
(45) Date of Patent: Aug. 9, 2022

(54) SYSTEM, METHOD, AND COMPUTER PROGRAM PRODUCT FOR PROCESSING WORKERS' COMPENSATION CLAIMS

(71) Applicant: American International Group, Inc., New York, NY (US)

(72) Inventors: Frank Schmid, Hoboken, NJ (US); Christopher Laws, Delray Beach, FL (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 499 days.

(21) Appl. No.: 14/816,210

(22) Filed: Aug. 3, 2015

(65) Prior Publication Data
US 2017/0039526 A1    Feb. 9, 2017

(51) Int. Cl.
| G06Q 40/08 | (2012.01) |
| G06Q 10/10 | (2012.01) |
| G06N 20/00 | (2019.01) |
| G06N 5/00 | (2006.01) |

(52) U.S. Cl.
CPC ......... *G06Q 10/1057* (2013.01); *G06N 5/003* (2013.01); *G06N 20/00* (2019.01); *G06Q 40/08* (2013.01)

(58) Field of Classification Search
CPC ... G06Q 10/1057; G06Q 40/08; G06N 99/005
USPC ............................................................ 705/4
See application file for complete search history.

(56) References Cited

U.S. PATENT DOCUMENTS

| 5,613,072 A * | 3/1997 | Hammond | G06Q 40/08 705/35 |
| 8,117,043 B2 * | 2/2012 | Hu | G06Q 40/08 705/2 |
| 8,452,621 B1 * | 5/2013 | Leong | G06Q 40/08 705/4 |

(Continued)

OTHER PUBLICATIONS

Title: Reengineering Claims Processing Using Probabilistic Inductive Learning Authors: Ruthra G. Arunasalam, et al. Publisher: IEEE Transaction on Engineering Manament, vol. 46, No. 3 Date: Aug. 1999 (Year: 1999).*

*Primary Examiner* — Christopher Bridges
*Assistant Examiner* — Yongsik Park
(74) *Attorney, Agent, or Firm* — Snell & Wilmer L.L.P.

(57) ABSTRACT

Systems and methods for administering a workers' compensation (WC) claim include a non-transitory, tangible computer-readable storage medium including a WC claim processing program bearing instructions for performing a settlement strategy for WC claims. A processor is configured to execute the WC claim processing program. The WC claim processing program includes a Cost of Waiting (COW) calculating module configured to calculate a COW for a predetermined period of time after an Arrival of a Settlement Opportunity (ASO) of each of the population of seasoned WC claims using the seasoned WC claim financial data and a machine learning module configured to conduct a regression analysis of the population of seasoned WC claims to determine a WC claim characteristic comprising an adversely-developing predictor that the COW of an open WC claim will more likely develop adversely when the corresponding WC claim characteristic data of the open WC claim matches the adversely-developing predictor.

18 Claims, 3 Drawing Sheets

(56) References Cited

U.S. PATENT DOCUMENTS

| | | | | |
|---|---|---|---|---|
| 8,577,786 | B1* | 11/2013 | Harnick | G06Q 40/08 705/37 |
| 8,630,878 | B1* | 1/2014 | Kravets | G06Q 40/08 705/4 |
| 8,694,339 | B1* | 4/2014 | Bunick | G06Q 40/08 700/32 |
| 2007/0294258 | A1* | 12/2007 | Caldwell | G06Q 10/10 |
| 2009/0281841 | A1* | 11/2009 | Basak | G06Q 40/02 705/4 |
| 2010/0017721 | A1* | 1/2010 | Williams | G06Q 20/00 715/740 |
| 2010/0240963 | A1* | 9/2010 | Brigham | G06Q 40/08 600/300 |
| 2011/0016377 | A1* | 1/2011 | Caldwell | G06Q 10/10 715/205 |
| 2012/0010907 | A1* | 1/2012 | Doelling | G06Q 40/08 705/4 |
| 2012/0010908 | A1* | 1/2012 | Doelling | G06Q 40/08 705/4 |
| 2012/0066008 | A1* | 3/2012 | Scudder | G06Q 40/08 705/4 |
| 2012/0102026 | A1* | 4/2012 | Fortune | G06Q 10/10 707/E17.014 |
| 2012/0143634 | A1* | 6/2012 | Beyda | G06Q 40/08 705/4 |
| 2014/0058765 | A1* | 2/2014 | Scudder | G06Q 30/0241 705/4 |

* cited by examiner

SYSTEM, METHOD, AND COMPUTER PROGRAM PRODUCT FOR PROCESSING WORKERS' COMPENSATION CLAIMS

TECHNICAL FIELD

This patent disclosure relates generally to a system, method, and computer program product for processing a workers' compensation claim and, more particularly, to a system, method, and computer program product for administering a settlement strategy for a workers' compensation claim.

BACKGROUND

Workers' compensation insurance is a type of insurance that provides medical benefits and/or wage replacement (indemnity) benefits to an employee that is injured in the course of employment. Various statutory requirements and economic practicalities, such as maintaining solvency, have prompted insurance companies that provide workers' compensation insurance to maintain reserve funds to pay for anticipated future losses to be incurred from a workers' compensation claim (also referred to herein as a "WC claim").

Due to the uncertain nature of claim duration, medical treatment, the healing process, etc., the information (i.e., the actual future payment stream) needed to calculate the actual current liability for a particular WC claim is not available until after the claim is closed (with no chance of it reopening) and all payments have been made. Thus, it is common practice for workers' compensation insurance carriers to maintain a loss reserve amount (case reserve) for each claim which corresponds to an estimate of the most likely amount of the actual outstanding ultimate liability associated with the given workers' compensation claim. Such case reserves are typically set by the Claims department.

In view of the difficulties in accurately predicting or forecasting such prospective liabilities, reserve amounts maintained by carriers can frequently substantially exceed or underestimate the actual ultimate costs incurred on such workers' compensation claims. Such disparities between predicted losses and actual losses annually can cost a workers' compensation insurance carrier significant amounts of money and be disruptive to its ongoing operation. As such, there is a continued need for approaches to processing a workers' compensation claim that help avoid the occurrence of the actual loss amount exceeding the case reserve amount of a WC claim. Furthermore, if a given WC claim can be (actively) settled by exchanging the uncertain future payment stream for a certain one (either lump sum or fixed annuity), the insurance carrier reduces its exposure to the risk that a given claim would develop in an adverse way (i.e., that the current case reserves would be insufficient to cover the realization of the current true liability).

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

BRIEF SUMMARY

Various aspects of the disclosure describe a computer-implemented system, a method, and a non-transitory, tangible computer-readable storage medium bearing instructions for processing a workers' compensation claim. In embodiments, a computer-implemented system for processing a workers' compensation claim includes a physical computer-readable medium that bears computer-executable instructions for determining whether to settle the WC claim based upon whether an adversely-developing predictor is present.

In one aspect, a computer-implemented system for a settlement strategy includes a non-transitory computer-readable medium including a WC claim processing application and a processor adapted to execute the WC claim processing application contained on the computer-readable medium. The WC claim processing application includes: (1) a Cost of Waiting ("COW") calculating module that is adapted to calculate a relative cost of allowing a claim to develop (for a predetermined period of time) under the current regime rather than settling the claim (for its respective case reserves) at the earliest Arrival of a Settlement Opportunity ("ASO") for a population of seasoned WC claim data of a given jurisdiction and (2) a machine learning module adapted to determine at least one WC claim characteristic comprising an adversely-developing predictor that more of future WC claims having the adversely-developing predictor will develop adversely than will develop favorably. The WC claim processing application can be configured to target such open WC claims that are likely to develop for settlement.

In one embodiment, a system for processing a WC claim includes a non-transitory computer-readable medium including a WC claim processing program, a processor in operable arrangement with the computer-readable medium, and a WC claim database in operable arrangement with the processor. The processor is configured to execute the WC claim processing program contained on the computer-readable medium. The WC claim database includes seasoned WC claim financial data relating to a population of seasoned WC claims of a jurisdiction, seasoned WC claim characteristic data relating to the population of seasoned WC claims, and corresponding WC claim characteristic data of an open WC claim.

The WC claim processing program includes a Cost of Waiting (COW) calculating module and a machine learning module. The COW calculating module includes a computer executable code segment configured to calculate a COW for a predetermined period of time after an Arrival of a Settlement Opportunity (ASO) of each of the population of seasoned WC claims using the seasoned WC claim financial data. The machine learning module includes a computer executable code segment configured to conduct a regression analysis of the population of seasoned WC claims using the seasoned WC claim characteristic data to determine a WC claim characteristic comprising an adversely-developing predictor that the COW of an open WC claim will more likely increase over a predetermined amount when the corresponding WC claim characteristic data of the open WC claim matches the adversely-developing predictor.

In another aspect, a method for processing a WC claim includes employing a processor to execute computer executable instructions stored on a non-transitory, computer-readable medium to perform steps. In one embodiment, a COW is calculated for a predetermined period of time after an ASO of each of a population of seasoned WC claims of a jurisdiction using seasoned WC claim financial data relating to the population of seasoned WC claims. For each seasoned WC claim in the population, the seasoned WC claim is classified as an adversely-developed WC claim when the COW of the seasoned WC claim satisfies a first predetermined condition and as a favorably-developed WC claim when the COW of the seasoned WC claim satisfies a second predetermined condition.

A regression analysis of the population of seasoned WC claims is conducted using seasoned WC claim characteristic data relating to the population of seasoned WC claims to determine a claim characteristic comprising an adversely-developing predictor. The adversely-developing predictor is present in a set of the WC claims of the seasoned population. The set has an adverse subset of adversely-developed WC claims and a favorable subset of favorably-developed WC claims. The adverse subset is greater than the favorable subset.

An open WC claim is evaluated by comparing corresponding WC claim characteristic data of the open WC claim to the adversely-developing predictor. When the corresponding WC claim characteristic data of the open WC claim matches the adversely-developing predictor, a settlement status indicator of the open WC claim stored in a WC claim database operably arranged with the processor is set to indicate settlement is sought.

In still another aspect, a non-transitory, tangible computer-readable storage medium is described. In embodiments, a non-transitory, tangible computer-readable storage medium bears computer executable instructions for processing a WC claim. The instructions, when executing on one or more computing devices, perform WC claim processing steps that follow principles of the present disclosure.

In one embodiment, a COW is calculated for a predetermined period of time after an ASO of each of a population of seasoned WC claims of a jurisdiction using seasoned WC claim financial data relating to the population of seasoned WC claims. For each seasoned WC claim in the population, the seasoned WC claim is classified as an adversely-developed WC claim when the COW of the seasoned WC claim satisfies a first predetermined condition and as a favorably-developed WC claim when the COW of the seasoned WC claim satisfies a second predetermined condition.

A regression analysis of the population of seasoned WC claims is conducted using seasoned WC claim characteristic data relating to the population of seasoned WC claims to determine a claim characteristic comprising an adversely-developing predictor. The adversely-developing predictor is present in a set of the WC claims of the seasoned population. The set has an adverse subset of adversely-developed WC claims and a favorable subset of favorably-developed WC claims. The adverse subset is greater than the favorable subset.

An open WC claim is evaluated by comparing corresponding WC claim characteristic data of the open WC claim to the adversely-developing predictor. A settlement status indicator of the open WC claim stored in a WC claim database operably arranged with the processor is set to indicate settlement is sought when the corresponding WC claim characteristic data of the open WC claim matches the adversely-developing predictor.

Further and alternative aspects and features of the disclosed principles will be appreciated from the following detailed description and the accompanying drawings. As will be appreciated, the principles related to processing a workers' compensation claim disclosed herein are capable of being carried out in other and different embodiments, and capable of being modified in various respects. Accordingly, it is to be understood that both the foregoing general description and the following detailed description are exemplary and explanatory only.

DETAILED DESCRIPTION

This disclosure relates to embodiments of a computer-implemented workers' compensation (WC) claim settlement strategy that helps an insurance provider determine which WC claims in a population of WC claims to target for settlement. In embodiments, a WC claim processing program is stored upon a non-transitory, tangible computer-readable medium in operable arrangement with a processor adapted to execute the WC claim processing program.

In embodiments, the WC claim processing program can include a machine learning module which uses historical workers' compensation claims data to predict how an open WC claim is likely to develop based on one or more claim characteristics of the open WC claim. In embodiments, the WC claims processing program can be used to classify an open WC claim as one being likely to develop adversely, likely to develop favorably, or likely to develop in a neutral way. The processor can be communicatively connected to one or more servers of partner entities that provide WC claim data relating to the historical workers' compensation claims.

In embodiments, a system following principles of the present disclosure can be used to determine which claims are likely to develop adversely and which claims are likely to develop favorably by conducting a regression analysis of the Cost of Waiting (COW) for each WC claim of the historical WC claims data under evaluation. The regression analysis can be used to generate a decision tree which can be used by an adjuster of an insurance provider to help determine a settlement strategy for open WC claims and to help to more accurately fund its reserves for its open WC claims.

Figure 1:
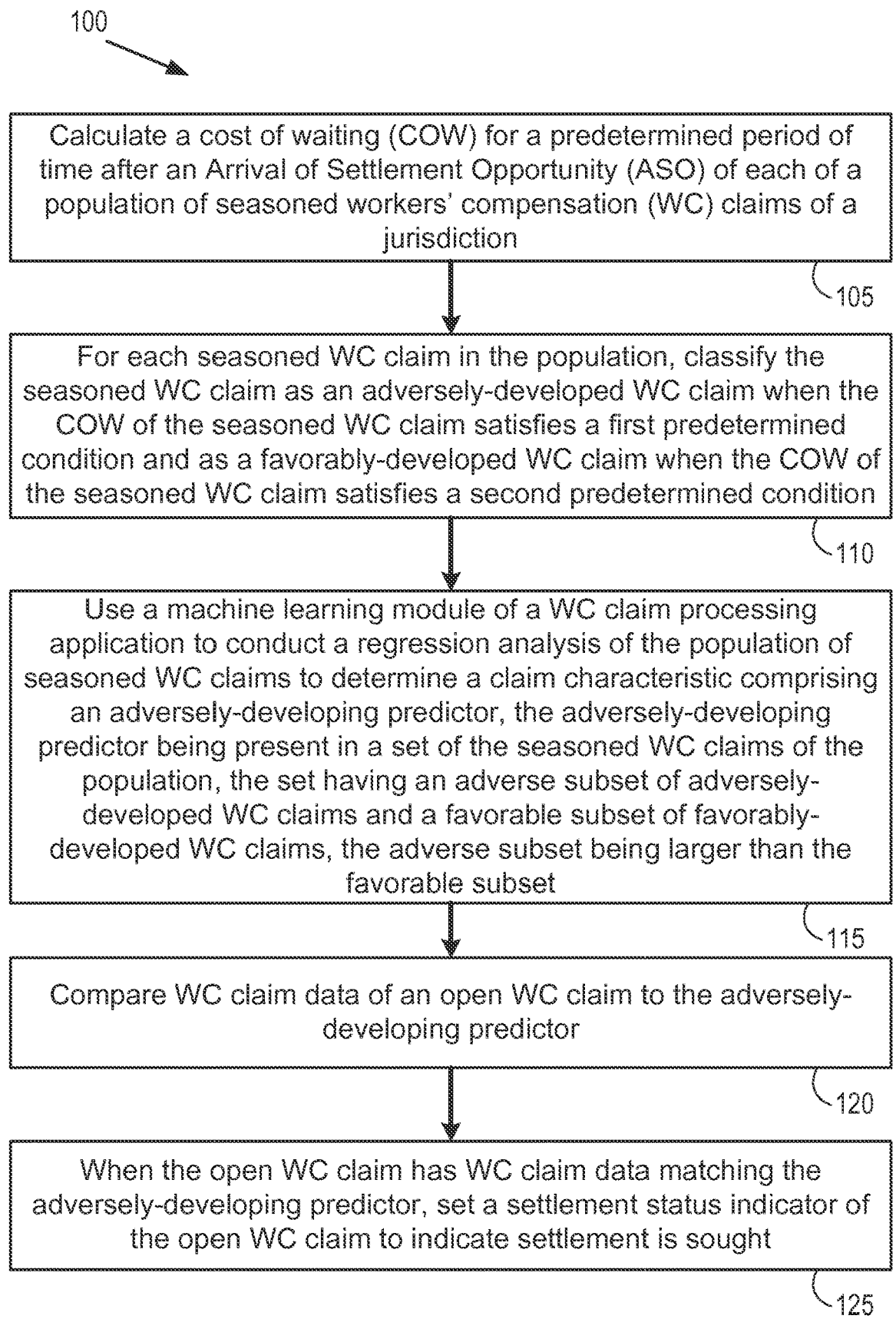
FIG. 1 is a flowchart illustrating steps of an embodiment of a method of processing a workers' compensation claim following principles of the present disclosure.

Turning now to the FIGURES, FIG. 1 shows steps of an embodiment of a method of processing a workers' compensation claim following principles of the present disclosure. In embodiments, a method for processing a WC claim following principles of the present disclosure includes employing a processor to execute computer executable instructions stored on a non-transitory computer-readable medium to perform WC claim processing steps relating to a settlement strategy. In one embodiment, a COW is calculated for a predetermined period of time after an Arrival of Settlement Opportunity (ASO) of each of a population of seasoned WC claims of a jurisdiction (step 105) using seasoned WC claim financial data relating to the population of seasoned WC claims.

In embodiments, a variety of approaches can be used to analyze the historical population of workers' compensation claims to determine a COW amount for each seasoned WC claim. In embodiments, the propensity of deterioration above what is currently anticipated and embedded in the case reserve is identified. In embodiments, for each claim in the studied population, the deterioration over a predefined period of time following the Arrival of Settlement Opportunity (ASO) is measured. For example, in embodiments, each claim in the studied population, the deterioration over seven quarters following the end of the quarter within which the ASO occurred is measured. In embodiments, the COW is measured as the change in the case incurred amount for a given WC claim over seven quarters (the sum of additional payments and the adjusted case reserve amount) relative to the reserve amount at the ASO (quarter end). Accordingly, a positive COW indicates that the claim has developed adversely when compared to the initial case reserve amount set for the particular WC claim.

In embodiments, the studied population can be limited to a predetermined time period. For example, in embodiments, the studied population can be limited to only those WC claims in which the ASO occurred within a predetermined time period (e.g., within a two-year time period, for example).

In embodiments, the ASO occurs when the claimant reaches maximum medical improvement (MMI) or, when such a date is not readily obtained from records, can be proxied through the payment patterns of a given claim. In embodiments, MMI is the point at which the injured worker's medical condition has stabilized and further functional improvement is unlikely, whether or not medical treatment or physical rehabilitation continues. MMI can occur when a treatment plateau in the injured worker's recovery is reached and no further healing or improvement is expected. In some instances, it may mean that the injured worker has fully recovered from the injury. At MMI, the degree of permanent or partial impairment the injured worker has sustained is more readily determinable.

In other embodiments, the ASO may occur prior to the point of MMI. In embodiments, the timing of the ASO can vary according to the jurisdiction in which the injured worker files the WC claim.

In embodiments, a method of processing a workers' compensation claim following principles of the present disclosure can be performed for each jurisdiction in which an insurance company has issued workers' compensation insurance. In embodiments, a jurisdiction can comprise a single state or a group of states that follows a similar WC claim processing rubric. In embodiments, the jurisdiction groups can be different for medical benefits than those for indemnity benefits. In embodiments, jurisdictions where indemnity or medical benefits cannot be settled (unless the claim is disputed) can be excluded from the respective (indemnity or medical) analysis. For example, in embodiments, the jurisdiction groups can include those shown in Tables I and II below.

TABLE I

MEDICAL BENEFITS JURISDICTION GROUPS

| JURISDICTION GROUP | STATES INCLUDED |
|---|---|
| California | California |
| New York | New York |
| Other "Can Settle Medical" Jurisdictions | AL, AK, AR, CO, CT, DE, DC, FL, GA, ID, IL, IN, IA, KS, KY, LA, ME, MD, MA, MI, MN, MS, MO, MT, NE, NV, NJ, NC, ND, OH, OK, OR, PA, RI, SD, SC, TN, UT, VT, VA, WV, WI, WY |

TABLE II

INDEMNITY BENEFITS JURISDICTION GROUPS

| JURISDICTION GROUP | STATES INCLUDED |
|---|---|
| California | California |
| New York | New York |
| Other Wage Loss Jurisdictions | AR, IL, LA, MS, NC, PA |
| Other "Can Settle Indemnity" Jurisdictions | AL, AK, AZ, CO, CT, DE, DC, FL, GA, HI, ID, IN, IA, KS, KY, ME, MD, MA, MI, MN, MO, MT, NE, NV, NH, NJ, NM, ND, OH, OK, OR, RI, SD, SC, TN, UT, VT, VA, WA, WV, WI, WY |

Referring back to FIG. 1, in step 110, for each seasoned WC claim in the historical population, the seasoned WC claim is classified as an adversely-developed WC claim when the COW of the seasoned WC claim satisfies a first predetermined condition and as a favorably-developed WC claim when the COW of the seasoned WC claim satisfies a second predetermined condition. For example, in embodiments, the first predetermined condition can comprise a COW that is positive, and the second predetermined condition can comprise a COW that is equal to or less than zero. In other embodiments, the COW for each seasoned WC claim in the population is analyzed to determine whether the WC claim satisfies a different first predetermined condition for being classified as an adversely-developed WC claim and a different second predetermined condition for being classified as a favorably-developed WC claim.

For example, in embodiments, the first predetermined condition is the COW is greater than a first predetermined amount, and the second predetermined condition is the COW is less than a second predetermined amount. In embodiments, the first predetermined amount is different from, and greater than, the second predetermined amount.

In yet other embodiments, classifying each seasoned WC claim includes classifying each WC claim in the population as a neutral WC claim when the COW of the seasoned WC claim satisfies a third predetermined condition. In embodiments, the third predetermined condition is the COW is less than or equal to the first predetermined amount and greater than or equal to the second predetermined amount.

For example, in embodiments, the COW of the population of historical WC claims can be grouped into multiple COW "buckets" or ranges. In embodiments, the WC claims can be grouped into a favorably-developing bucket where the COW is less than −$5,000; a neutral bucket where the COW is between −$5,000 and +$5,000; and an adversely-developing bucket where the COW is greater than +$5,000. Accordingly, in such embodiments, a region including a COW equal to zero (and determined to be reasonably close to zero) is removed from the favorably-developing bucket and from the adversely-developing bucket to remove such otherwise ambiguous WC claims from these two classes. In embodiments, following the multiple bucketing approach can help make a settlement strategy following principles of the present disclosure more refined.

A machine learning module of a WC claim processing application can be used to conduct a regression analysis of the population of seasoned WC claims using seasoned WC claim characteristic data relating to the population of seasoned WC claims to determine a claim characteristic comprising an adversely-developing predictor (step 115). The adversely-developing predictor is present in a set of the seasoned WC claims of the population. The set has an adverse subset of adversely-developed WC claims and a favorable subset of favorably-developed WC claims. The adverse subset is greater than the favorable subset. In embodiments, regression analysis is used to identify a claim characteristic comprising an adversely-developing predictor for which an adverse set of WC claims with the claim characteristic have a COW exceeding a predetermined amount and a favorable set of WC claims with the claim characteristic have a COW below a predetermined amount, wherein the adverse set is larger than the favorable set.

In embodiments, exemplary claim characteristics which can comprise either an adversely-developing predictor or a favorably-developing predictor include: claimant body part injured, claimant age at injury, claimant gender, claimant opioid usage (prior to ASO), claimant pre-injury weekly wage relative to the state average weekly wage for the year of the injury, and whether claimant is represented by an attorney (as of ASO). In embodiments, the claim characteristic relating to the claimant body part injury can assess whether it is a particular body part injury that is likely to develop or not likely to develop. For example, in embodiments, the claim characteristic can include whether an injury to the head, lower extremity, neck, spinal cord, or multiple body parts is likely to develop. In embodiments, the claim characteristic can include whether an injury to the trunk or upper extremity is likely to develop. In embodiments, the claim characteristic can include whether opioid usage prior to the ASO occurred. In embodiments, the claim characteristic can include whether the claimant is represented by an attorney as of the ASO.

In embodiments, dedicated regression analyses are run for each benefit state or jurisdiction group. In embodiments, dedicated regression analyses are run for each jurisdiction differentiated by indemnity and medical benefits. In embodiments, the method of processing a WC claim includes segmenting a set of seasoned WC claims by (groups of) jurisdiction(s).

Referring to FIG. 1, an open WC claim is evaluated by comparing corresponding WC claim characteristic data of the open WC claim to the adversely-developing predictor (step 120).

When the corresponding WC claim characteristic data of the open WC claim matches the adversely-developing predictor, a settlement status indicator of the open WC claim stored in a WC claim database operably arranged with the processor is set to indicate settlement is sought (step 125). The method 100 can be repeated for a series of open WC claims or step 125 of method 100 can be repeated for a series of open WC claims such that each WC claim expected to develop adversely is targeted for settlement, thereby helping to avoid adverse development that might otherwise occur.

In embodiments, the machine learning module of the WC claim processing application can be used to conduct regression analysis that identifies a favorably-developing predictor. The favorably-developing predictor is present in another set of the seasoned WC claims of the population. This set has an adverse subset of adversely-developed WC claims and a favorable subset of favorably-developed WC claims that is greater than the adverse subset.

In embodiments where the COW is grouped into one of a favorably-developing bucket, a neutral bucket, and an adversely-developing bucket, regression analyses can be conducted to generate at least one of each of the following predictors: an adversely-developing predictor, a favorably-developing predictor, and a neutral predictor. The WC claim processing application can be configured to compare WC claim data of an open WC claim to the various predictors to tag the open WC claim in question as one that is expected to develop adversely, to develop neutrally, or to develop favorably. In embodiments, WC claim processing application can be configured to target for settlement those open WC claims expected to develop adversely based on matching one or more adversely-developing predictors. The open WC claims expected to develop neutrally and/or favorably are not flagged for settlement. In other embodiments, the WC claim processing application can be configured to set more refined settlement flags (e.g., "settlement sought, but not vital", "settlement sought, and vital") or even to rank order claims by settlement posture.

In embodiments, steps 105, 110, 115, 120, and 125 can be periodically repeated with a different population of seasoned WC claims of the jurisdiction group. In embodiments, a different population of seasoned WC claims of the jurisdiction is periodically compiled. For example, in embodiments, the population of seasoned WC claims of the jurisdiction group can be periodically updated with the seasoned WC claims from a more recent time period or for an extended time period relative to the prior population evaluated.

Figure 2:
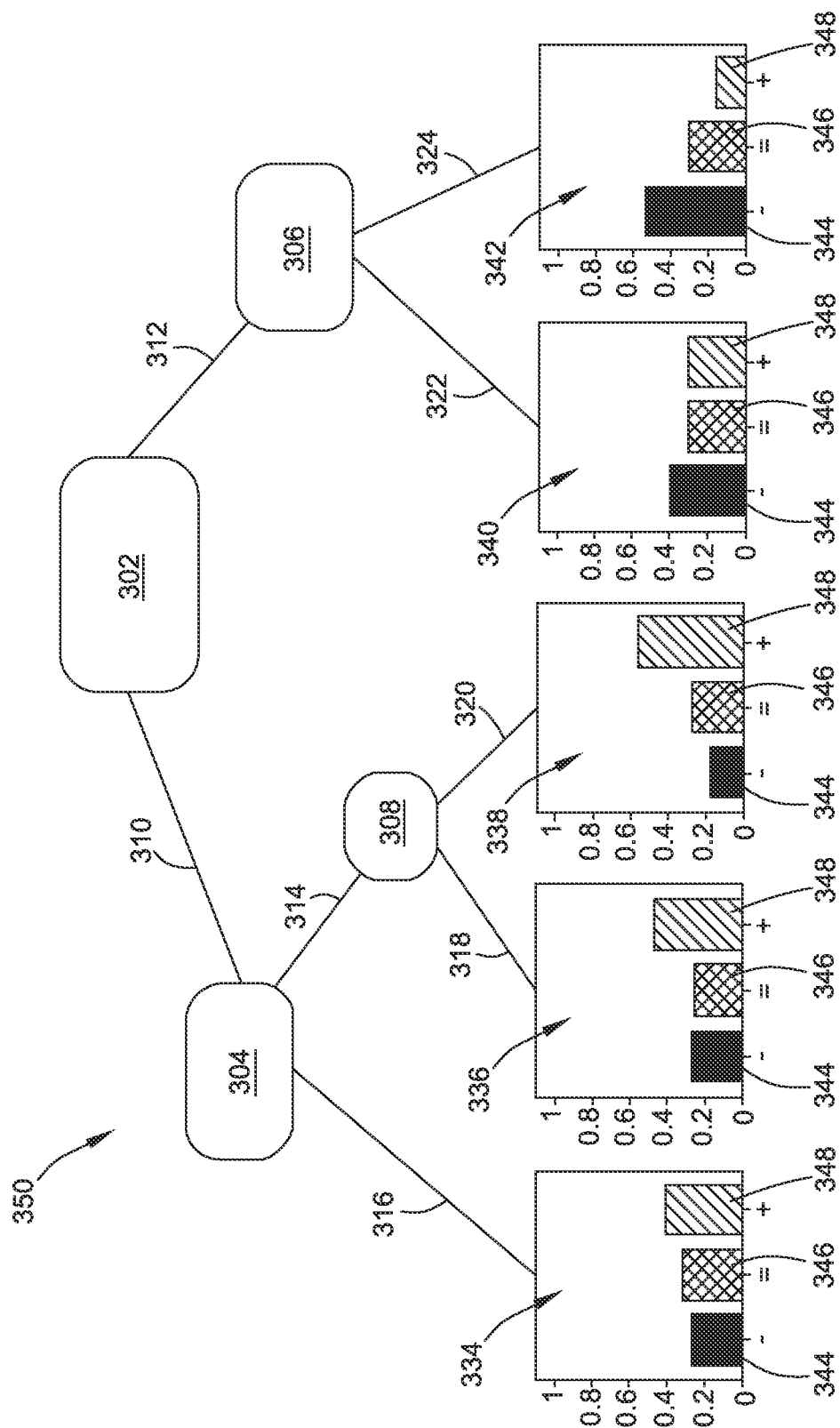
FIG. 2 is a diagram of an embodiment of a decision tree analysis constructed using principles of the present disclosure.

FIG. 2 shows an exemplary embodiment of a decision tree analysis used to predict a cost of waiting for an open claim in accordance with the disclosure. The machine learning module of the WC claim processing program can be configured to generate a decision tree analysis to administer a settlement strategy for an open WC claim based upon a prediction of how the open WC claim is likely to develop.

In embodiments, the decision tree analysis considers implicit and explicit characteristics. Implicit characteristics include the state in which the claim is filed and the type of benefit that is received, medical or indemnity. Explicit characteristics include claimant body part injured, age of injured, claimant gender, opioid usage prior to ASO, claimant attorney involvement as of ASO, and claimant pre-injury weekly wage relative to the state average weekly wage for the year of injury. A separate decision tree analysis is run for each implicit characteristic. Claims from jurisdictions where indemnity or medical benefits cannot be settled are excluded from the respective indemnity or medical analysis.

In embodiments, the complexity of the regression tree can be governed by the choice of the type-1 error rate, which is the probability that a branch is included although it should be left out. Lowering the type-1 error rate can reduce the complexity of a given regression tree. At the same time, lowering the type-1 error rate increases the type-2 error rate, which is the probability that a branch is left out although it should be included. In embodiments, the type-1 error rate of the regression tree can be set at two percent. In embodiments, the type-1 error rate can be up to five percent. In yet other embodiments, the type-1 error rate can be up in a range between one percent and five percent. The height of each bar gives the portion of claims in the given bucket. In embodiments, predictors are restricted to the state of knowledge at the time of ASO. In embodiments, a terminal node can be configured to be of sufficient size.

The illustrated decision tree 350 shows the regression analysis of a population of seasoned WC claims segmented by the implicit characteristics of the jurisdiction of the State of California for medical benefits. A root node 302 represents a most impactful explicit characteristic for the illustrated population relating to the implicit characteristics. In the illustrated embodiment, the root node 302 relates to the explicit WC claim characteristic whether the claimant has attorney involvement at the time of ASO.

A first branch 310 represents a decision of the root node 302 and a second branch 312 represents an opposing decision of the root node 302. In the illustrated embodiment, the first branch 310 is taken if the claimant has an attorney at the time of the ASO, and the second branch is taken if the claimant does not have an attorney.

The first branch 310 leads to a first intermediate node 304. The first intermediate node 304 represents a second most impactful explicit characteristic based on the response to the decisional at the root node 302. In the illustrated embodiment, the first intermediate node 304 refers to whether the claimant used opioids in the two year window just prior to ASO.

A pair of intermediate branches 314, 316 of the first intermediate node 304 represents a decision and an opposing decision, respectively, of the first intermediate node 304. In the illustrated embodiment, the first branch 314 leads to a second intermediate node 308 and is followed if the claimant uses opioids. The second branch 316 leads to a first terminal node 334 and is followed if the claimant does not use opioids.

The second intermediate node 308 represents the next most impactful explicit characteristic based on the response to the first intermediate node 304 and root note 302. In the illustrated embodiment, the second intermediate node 308 relates to the explicit WC claim characteristic of the claimant's age at the time of the injury. A first branch 318 of the second intermediate node 308 leads to a second terminal node 336 and is taken in the illustrated embodiment if the claimant is 35 years of age or younger at the time of the injury. A second branch 320 of the second intermediate node 308 leads to a third terminal node 338 and is taken in the illustrated embodiment if the claimant is greater than 35 years of age at the time of the injury.

The second branch 312 of the root node 302 leads to a third intermediate node 306. In the illustrated embodiment, the third intermediate node 306 relates to the explicit WC claim characteristic of the body part group in which the injury occurred. A first branch 322 of the third intermediate node 306 leads to a fourth terminal node 340 and is taken in the illustrated embodiment if the claimant is injured in the head, neck, spinal cord, trunk, upper extremities or multiple locations. A second branch 324 of the third intermediate node 306 leads to a fifth terminal node 342 and is taken in the illustrated embodiment if the claimant is injured in the lower extremities.

Each of the terminal nodes 334, 336, 338, 340, 342 display the percentages of seasoned WC claims from the population under study that satisfy the WC claim characteristics which lead to the respective terminal node 334, 336, 338, 340, 342. The height of each bar 344, 346, 348 indicates the percentage of the WC claims in the given bucket that are respectively classified as having developed favorably 344, developed neutrally 346, and developed adversely 348. The probability that a future claim will (and the portion of seasoned claims that did) develop favorably 344 is designated by a "−" sign (e.g., the COW is less than the reserved amount at the time of the ASO by a predetermined amount (e.g., −$5,000)), the probability that a future claim will (and the portion of seasoned claims that did) develop adversely 348 is designated by a "+" sign (e.g., the COW is greater than the reserved amount at the time of the ASO by a predetermined amount (e.g., +$5,000)), and the probability that a future claim will (and the portion of seasoned claims that did) develop in a neutral way is designated by an "=" sign (the COW will be approximately equal to the reserved amount at the time of the ASO (e.g., the COW is between ±$5,000).

As shown in FIG. 2, the terminal nodes 334, 336, and 338 that follow from the first branch 310 of the root node 302 all comprise an adversely-developing predictor. In each of the terminal nodes 334, 336, and 338, the adversely-developed bucket 348 is greater than the favorably-developed bucket 344. The terminal nodes 340, 342 that follow from the second branch 312 of the root node 302 all comprise a favorably-developing predictor. In each of the terminal nodes 340, 342, the favorably-developed bucket 344 is greater than the adversely-developed bucket 348.

Figure 3:
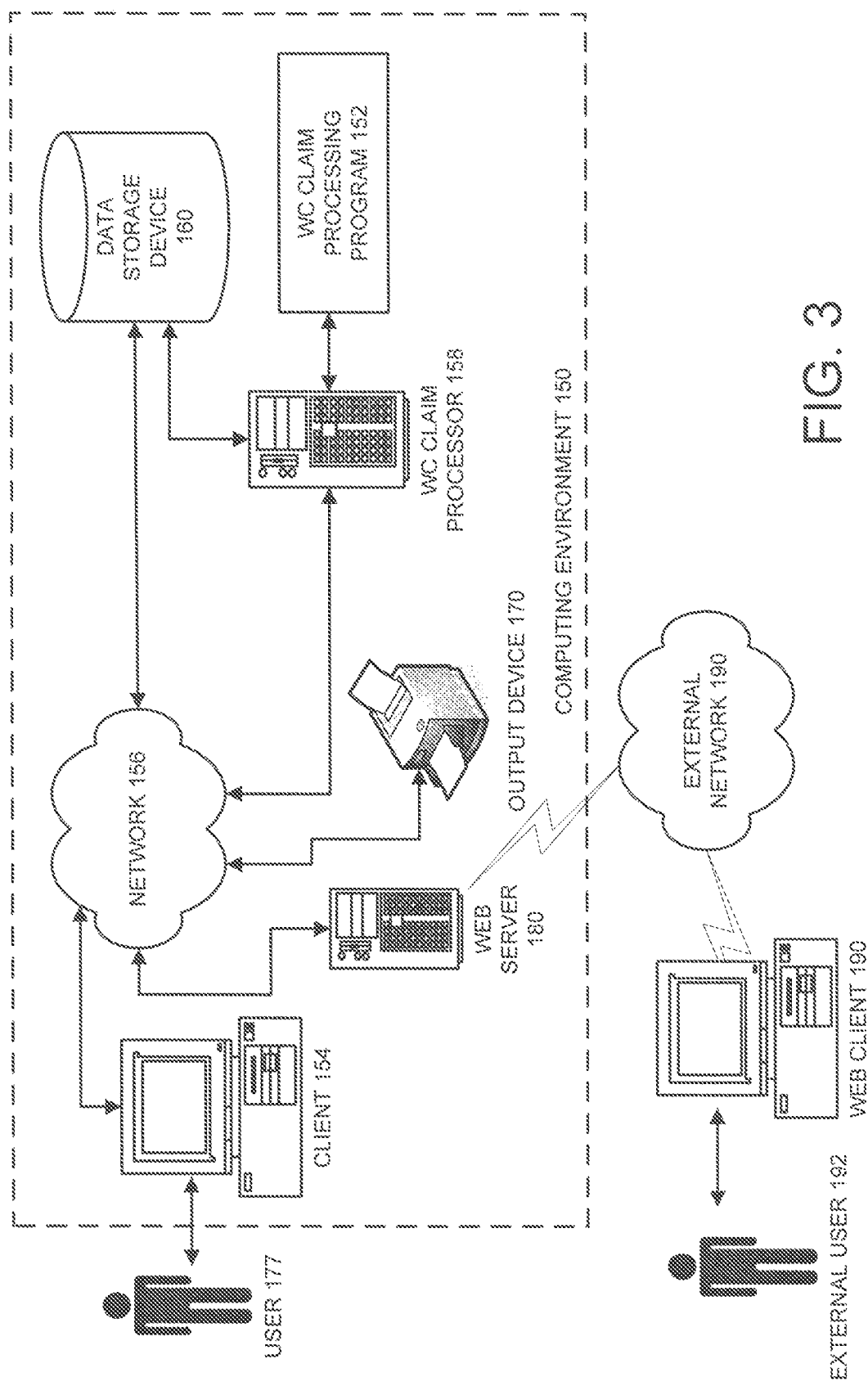
FIG. 3 is a schematic view of an embodiment of a computing environment constructed in accordance with principles of the present disclosure.

Referring to FIG. 3, an embodiment of a computing environment 150 following principles of the present disclosure is shown that includes a WC claim processing program 152 for processing a workers' compensation claim. WC claim processing program 152 can be stored on a non-transitory, computer-readable medium. The computing environment 150 constitutes a computer-implemented system for processing a WC claim. The computing environment 150 can include a number of computer systems, which generally can include any type of computer system based on: a microprocessor, a mainframe computer, a digital signal processor, a portable computing device, a personal organizer, a device controller, or a computational engine within an appliance. In some embodiments, the computing environment 150 is implemented in one or more electronic devices that are located in one or more locations.

The illustrated computing environment 150 includes a client 154, an internal network 156, at least one WC claim processor 158 adapted to operate the WC claim processing program 152, a data storage device 160, an output device 170, and a web server 180 operatively connected to an external network 190. The client 154, the WC claim processor 158, the data storage device 160, the output device 170, and the web server 180 are operatively connected together via the internal network 156.

A web client 190 can use the computing environment 150 to interface with the insurance provider operating the computing environment 150. For example, an external user 192 can use the web client 190 to receive information from, and to transmit information to, the insurance provider's computing environment 150 about historical WC claim data for a population of seasoned WC claims and a population of open WC claims in a given jurisdiction for use by the WC claim processing program 152. In embodiments, the insurance provider can be communicatively connected with one or more partner sites (such as the external user 192 who provides WC claim data) and its customers via the external network 190. In other embodiments, a different communication channel can be established between the external user 192 and the WC claim processing program 152 to transmit data feeds to the WC claim processing program 152. In still other embodiments, the insurance provider can use another communication channel, such as a telephone network, for example, to communicate with the external user 192.

The client 154 can be used to communicate with an authorized user 177 to enter historical WC claim or new WC claim data into the data storage device 160 for use by the WC claim processing program 152, to communicate with the web client 190, and/or to operate the WC claim processing program 152. The client 154 can comprise at least one input device. The client 154 can generally include any node on a network including computational capability and including a mechanism for communicating across the network 156.

In one embodiment, the client 154 hosts an application front end of the WC claim processing program 152. The application front end can generally include any component of the WC claim processing program 152 that can receive input from the user 177 or the client 154, communicate the input to the WC claim processing program 152, receive output from the WC claim processing program 152, and present the output to the user 177 and/or the client 154. In one embodiment, the application front end can be a stand-alone system.

The network 156 can generally include any type of wired or wireless communication channel capable of coupling together computing nodes. Examples of a suitable network 156 include, but are not limited to, a local area network, a wide area network, or a combination of networks.

The WC claim processor 158 operates the WC claim processing program 152 which can be stored upon a non-transitory, tangible computer-readable medium. In embodiments, the WC claim processor 158 is in operable arrangement with the computer-readable medium that includes the WC claim processing program 152. The WC claim processor 158 is configured to execute the WC claim processing program 152 contained on the computer-readable medium. The WC claim processor 158 can generally include any computational node including a mechanism for servicing requests from a client for computational resources, data storage resources, or a combination of computational and data storage resources. Furthermore, the claim processor 158 can generally include any system that can host the WC claim processing program 152. The WC claim processor 158 can generally include any component of an application that can receive input from the web client(s) 190 via the web server 180 and from the client(s) 154 through the network 156, process the input, and present the output to the WC claim processing program 152, the client 154, the web server 180, and/or the data storage device 160. The WC claim processor 158 can generally include any component of an application that can process data, interact with the data storage device 160, and execute logic for the WC claim processing program 152.

In embodiments, the WC claim processing program 152 comprises a computer program product residing on a non-transitory, tangible computer readable medium having a plurality of instructions stored thereon which, when executed by the WC claim processor 158, cause the processor 158 to perform steps associated with any embodiment of a method of processing a WC claim following principles of the present disclosure. In embodiments, the WC claim processing program 152 can be any suitable computer-implemented application for processing information exchanged with the client 154 and/or the web client 190 via a web platform such as those known to one of ordinary skill in the art. The WC claim processing program 152 can contain computer executable instructions adapted to exchange information in the form of data with the data storage device 160. The WC claim processing program 152 can include a graphical user interface which can facilitate the input of WC claim data relating to an open WC claim and/or a closed WC claim into the WC claim processing program 152.

In embodiments, the WC claim processing program 152 includes: (1) a cost of waiting ("COW") calculating module that is adapted to calculate the relative cost of allowing a claim to develop (for a predetermined period of time) under the current regime rather than settling the claim (for its respective case reserves) at the earliest Arrival of a Settlement Opportunity (ASO) for a population of seasoned WC claim data of a given jurisdiction and (2) a machine learning module adapted to determine at least one WC claim characteristic comprising an adversely-developing predictor that more of future WC claims having the adversely-developing predictor will develop adversely than will develop favorably.

In embodiments, the machine learning module of the WC claim processing program 152 is used to conduct a regression analysis of the population of seasoned WC claims to determine a claim characteristic comprising an adversely-developing predictor. The adversely-developing predictor is present in a set of the seasoned WC claims of the population. The set has an adverse subset of adversely-developed WC claims and a favorable subset of favorably-developed WC claims. The adverse subset is greater than the favorable subset.

In embodiments, the machine learning module is configured to determine an adversely-developing predictor of the COW for an open WC claim based on the open claim's implicit and explicit characteristics. The WC claim processing program uses the presence of the adversely-developing predictor to classify the open WC claim as likely to develop adversely (and, in some embodiments generating at least one favorably-developing predictor and neutral-developing predictor, likely to develop favorably or likely to develop neutrally).

In embodiments, the WC claim processing program 152 includes a Cost of Waiting (COW) calculating module and a machine learning module. The COW calculating module includes a computer executable code segment configured to calculate a COW for a predetermined period of time after an ASO of each of a population of seasoned WC claims of a jurisdiction using seasoned WC claim financial data stored in the data storage device 160. The machine learning module includes a computer executable code segment configured to conduct a regression analysis of the population of seasoned WC claims using seasoned WC claim characteristic data stored in the data storage device 160 to determine a WC claim characteristic comprising an adversely-developing predictor that the COW of an open WC claim will more likely increase over a predetermined amount when corresponding WC claim characteristic data of the open WC claim matches the adversely-developing predictor. In embodiments, the corresponding WC claim characteristic data of the open WC claim can be stored in the data storage device 160.

In embodiments, the WC claim processing program 152 includes a WC claim comparing module. The WC claim comparing module includes a computer executable code segment configured to compare the corresponding WC claim characteristic data of the open WC claim to the adversely-developing predictor and to set a settlement status indicator of the open WC claim stored in a WC claim database of the data storage device 160 to indicate settlement is sought when the corresponding WC claim characteristic data of the open WC claim matches the adversely-developing predictor.

In embodiments, the WC claim processing program 152 includes a WC claim classifying module. The WC claim classifying module includes a computer executable code segment configured to classify each seasoned WC claim in the population as an adversely-developed WC claim when the COW of the seasoned WC claim satisfies a first predetermined condition and as a favorably-developed WC claim when the COW of the seasoned WC claim satisfies a second predetermined condition. In embodiments, the first predetermined condition is that the COW is greater than a first predetermined amount, and the second predetermined condition is that the COW is less than a second predetermined amount. For example, in embodiments, the first predetermined condition can comprise a COW that is positive, and the second predetermined condition can comprise a COW that is equal to or less than zero.

In embodiments, the first predetermined amount is different from, and greater than, the second predetermined amount. The WC claim classifying module can be configured to classify each seasoned WC claim in the population as a neutral WC claim when the COW of the seasoned WC claim satisfies a third predetermined condition. In embodiments, the third predetermined condition is that the COW is less than or equal to the first predetermined amount and greater than or equal to the second predetermined amount.

The architecture solution of the WC claim processing program 152 is flexible and scalable to include additional features for processing a WC claim according to principles of the present disclosure. In embodiments, the WC claim processing program 152 includes other modules and computer-executable instructions adapted to carry out other steps and features of a method for processing a WC claim following principles of the present disclosure.

Any suitable computer-readable storage medium can be utilized for the WC claim processing program 152, including, for example, hard drives, floppy disks, CD-ROM drives, tape drives, zip drives, flash drives, optical storage devices, magnetic storage devices, and the like. The client 154 can be used by an authorized user 177 to help administer the WC claim processing program 152.

The database or data storage device 160 can generally include any type of system for storing data in non-volatile storage. This includes, but is not limited to, systems based upon: magnetic, optical, and magneto-optical storage devices, as well as storage devices based on flash memory and/or battery-backed up memory. In embodiments, the data storage device 160 includes a WC claim database which is operably arranged with the WC claim processor 158 and adapted to store WC claim data. In one embodiment, the database 160 contains claim data associated with historical WC claims. In embodiments, the WC claim database includes seasoned WC claim financial data relating to a population of seasoned WC claims of a jurisdiction, seasoned WC claim characteristic data relating to the population of seasoned WC claims, and corresponding WC claim characteristic data of at least one open WC claim. This information can be used by the WC claim processing program 152 to perform a method of processing a WC claim according to principles of the present disclosure. In embodiments, the WC claim database includes information for a population of open WC claims for a jurisdiction. In embodiments, the WC claim database includes WC claim information relating to both seasoned and open WC claims for a number of jurisdictions. The data storage device 160 can contain a permission database which stores user credentials and permissions specific to active users 177 and external users 192 that interact with the computing environment 150.

The output device 170 can comprise a printer, a display monitor, and a connection to another device, for example. The output device 170 can be used to generate reports for sending to the external user 192 which contain information generated by the WC claim processing program 152. The output device 170 can be used to communicate to the user 177 information generated by the WC claim processing program 152 about a closed or an open WC claim.

A report engine can be provided to generate displays of information stored in the data storage device 160 concerning closed and open WC claims, which can be viewed using the output device 170, for example. In one embodiment, the report engine further provides pre-configured and/or ad hoc reports relating to the settlement status of an open WC claim.

The web server 180 can provide a suitable web site or other Internet-based graphical user interface which is accessible by the external user 192. The web server 180 can serve as a web-enabled interface adapted to exchange information with a first partner site 190, including a partner site configured to supply claim data for use by WC claim processing program 152, for example. In other embodiments, other partner sites can be connected to the web-enabled interface.

The web server 180 can provide access to an internet-based web platform that includes the WC claim processing program 152. In some embodiments, the web server 180 can be adapted to host a web site, to execute enterprise applications, to deliver web pages and other content upon request to web clients, and to receive content from web clients. The web client 190 can be connected to the web server 180 through the network connection 190 (e.g., Internet, Intranet, LAN, WAN and the like). The web server 180 can use an authentication server in order to validate and assign proper permissions to authorized users of the system. A permission database can store web user credentials and permissions specific to each user, investor, agent, broker, market information source, etc. The web server 180 can be outfitted with a firewall such that requests originating from outside the computing environment 150 pass through the firewall before being received and processed at the web server 180.

In addition to the components discussed above, the computing environment 150 can further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

In yet other embodiments, the computing environment can include an electronic common repository for electronic documents relating to policies issued by the insurance provider and the associated underlying WC claims. The electronic common repository can be used by users 177, external users 192, and others according to a set of authorized permissions to the respective party to upload electronic documents.

In other embodiments, systems and methods of processing a workers' compensation claim can be implemented on various types of computer architectures, such as for example on a single general purpose computer or workstation, on a networked system, in a client-server configuration, or in an application service provider configuration. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, flash memory, flat files, databases, programming data structures, programming variables, IF-THEN (or similar type) statement constructs, etc.). It is noted that data structures describe formats for use in organizing and storing data in databases, programs, memory, or other tangible computer-readable media for use by a computer program.

The computer components, software modules, functions, data stores and data structures described herein may be connected directly or indirectly to each other in order to allow the flow of data needed for their operations. It is also noted that a module or processor can include but is not limited to a unit of code that performs a software operation, and can be implemented, for example, as a subroutine unit of code, a software function unit of code, an object (as in an object-oriented paradigm) or an applet and can be implemented in a computer script language or another type of computer code. The software components may be located on a single computer or distributed across multiple computers depending upon the particular circumstances surrounding its use (e.g., located on client and/or server computers).

In various embodiments, methods of processing a workers' compensation claim in accordance with principles of the present disclosure operate as software programming operating on a computer processor. Dedicated hardware implementations, including, but not limited to, application-specific integrated circuits, programmable logic arrays and other hardware devices, can likewise be constructed to implement the methods described herein. Furthermore, alternative software implementations, including, but not limited to, distributed processing or component/object distributed processing, parallel processing, or virtual machine processing, can also be constructed to implement the methods described herein.

In various embodiments, a WC claim processing program in accordance with principles of the present disclosure can take the form of a computer program product on a non-transitory, tangible computer-readable storage medium having computer-readable program code means embodied in the storage medium. Software implementations of the program for classifying a claim as described herein can be stored on any suitable tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, a tangible storage medium includes a distribution medium and art-recognized equivalents and successor media, in which the software implementations herein are stored.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for processing a workers' compensation (WC) claim, the system comprising:
   a non-transitory computer-readable medium including a WC claim processing program;
   a processor in operable arrangement with the computer-readable medium, the processor configured to execute the WC claim processing program contained on the computer-readable medium;
   a WC claim database in operable arrangement with the processor, the WC claim database including seasoned WC claim financial data relating to a population of seasoned WC claims of a jurisdiction, seasoned WC claim characteristic data relating to the population of seasoned WC claims, and corresponding WC claim characteristic data of an open WC claim;
   a display device in operable arrangement with the processor, the display device configured to display indicia based upon a digital signal received from the processor;
   wherein the WC claim processing program includes a Cost of Waiting (COW) calculating module, a plurality of machine learning modules, a WC claim comparing module, and a WC claim classifying module:
      the COW calculating module including a first computer executable code segment configured to calculate a maximum medical improvement (MMI) based on an analysis of a medical condition of an injured worker stabilizing, a medical treatment plateau and payment patterns,
      the COW calculating module including a second computer executable code segment configured to calculate a COW for a predetermined period of time after an Arrival of a Settlement Opportunity (ASO) of each of the population of seasoned WC claims using the seasoned WC claim financial data and the MMI,
      the plurality of machine learning modules including a computer executable code segment configured to conduct a regression analysis of the population of seasoned WC claims using the seasoned WC claim characteristic data to train the plurality of the machine learning modules to determine a WC claim characteristic comprising an adversely-developing predictor that the COW of an open WC claim will more likely increase over a predetermined amount when the corresponding WC claim characteristic data of the open WC claim matches the adversely-developing predictor, the plurality of machine learning modules using a presence of the adversely-developing predictor to classify the open WC claim as likely to develop adversely, each of the machine learning modules of the plurality of machine learning modules is dedicated to a state or jurisdiction, the machine learning module is used to create a regression analysis that generates a decision tree in memory for each characteristic of a plurality of characteristics to administer a settlement strategy for the open WC claim based upon a prediction of how the open WC claim is likely to develop, the decision tree is analyzed for each explicit characteristic that represents a branch in the decision tree, while a separate analysis of the decision tree is run for the implicit characteristics, each of the plurality of machine learning modules having a graphical decision tree created by the machine learning module, wherein the machine learning module includes a second computer executable code segment configured to generate a graphical decision tree analysis of a settlement administration strategy for the open WC claim based upon a prediction of how the open WC claim is likely to develop and based upon the regression analysis for display by the display device, the WC claim comparing module including a computer executable code segment configured to compare the corresponding WC claim characteristic data of the open WC claim to the adversely-developing predictor and to set a settlement status indicator of the open WC claim stored in the WC claim database to indicate settlement is sought when the corresponding WC claim characteristic data of the open WC claim matches the adversely-developing predictor, and the WC claim classifying module including a computer executable code segment configured to classify each seasoned WC claim in the population as an adversely-developed WC claim when the COW of the seasoned WC claim satisfies a first predetermined condition and as a favorably-developed WC claim when the COW of the seasoned WC claim satisfies a second predetermined condition, wherein the graphical decision tree analysis includes a root node, a first branch, a second branch, a first terminal node, and a second terminal node, the first branch extending between the root node and the first terminal node, the second branch extending between the root node and the second terminal node, the first branch representing a decision of the root node, and the second branch representing an opposing decision of the root node, the first terminal node and the second terminal node each containing a graphical depiction of the amount of the adversely-developed WC claims and the amount of favorably-developed WC claims of the population of seasoned WC claims, wherein the amount of the adversely-developed WC claims is greater than the favorably-developed claims in the first terminal node, and wherein the amount of the adversely-developed WC claims is less than the favorably-developed claims in the second terminal node.

2. The system for processing according to claim 1, wherein the first predetermined condition is the COW is greater than a first predetermined amount, and the second predetermined condition is the COW is less than a second predetermined amount.

3. The system for processing according to claim 1, wherein the WC claim characteristic is determined by conducting the regression analysis such that the adversely-developing predictor is present in a set of the WC claims of the seasoned population, the set having an adverse subset of adversely-developed WC claims and a favorable subset of favorably-developed WC claims, the adverse subset being greater than the favorable subset.

4. The system for processing according to claim 3, wherein the first predetermined condition is the COW is greater than a first predetermined amount, and the second predetermined condition is the COW is less than a second predetermined amount.

5. The system for processing according to claim 4, wherein the first predetermined amount is different from, and greater than, the second predetermined amount, and wherein the WC claim classifying module is configured to classify each seasoned WC claim in the population as a neutral WC claim when the COW of the seasoned WC claim satisfies a third predetermined condition, and the third predetermined condition is the COW is less than or equal to the first predetermined amount and greater than or equal to the second predetermined amount.

6. The system for processing compensation claim according to claim 3, wherein the first predetermined condition is the COW is positive, and the second predetermined condition is the COW is equal to or less than zero.

7. A method for processing a workers' compensation (WC) claim comprising:
employing a processor to execute computer executable instructions stored on a non-transitory, computer-readable medium to perform steps, the steps including:
calculating a maximum medical improvement (MMI) based on an analysis of a medical condition of an injured worker stabilizing, a medical treatment plateau and payment patterns,
calculating a Cost of Waiting (COW) for a predetermined period of time after an Arrival of a Settlement Opportunity (ASO) of each of a population of seasoned WC claims of a jurisdiction using seasoned WC claim financial data relating to the population of seasoned WC claims and the MMI,
training a plurality of machine learning modules with each seasoned WC claim in the population, such that the plurality of machine learning modules classifies the seasoned WC claim as an adversely-developed WC claim when the COW of the seasoned WC claim satisfies a first predetermined condition and as a favorably-developed WC claim when the COW of the seasoned WC claim satisfies a second predetermined condition,
classifying, by the plurality of machine learning modules using a presence of the adversely-developing predictor, the open WC claim as likely to develop adversely,
conducting, by the plurality of machine learning modules, a regression analysis of the population of seasoned WC claims using seasoned WC claim characteristic data relating to the population of seasoned WC claims to determine a claim characteristic comprising an adversely-developing predictor, the adversely-developing predictor being present in a set of the WC claims of the seasoned population, the set having an adverse subset of adversely-developed WC claims and a favorable subset of favorably-developed WC claims, the adverse subset being greater than the favorable subset, evaluating an open WC claim by comparing corresponding WC claim characteristic data of the open WC claim to the adversely-developing predictor, setting a settlement status indicator of the open WC claim stored in a WC claim database operably arranged with the processor to indicate settlement is sought when the corresponding WC claim characteristic data of the open WC claim matches the adversely-developing predictor, each of the machine learning modules of the plurality of machine learning modules is dedicated to a state or jurisdiction, each of the plurality of machine learning modules having a graphical decision tree created by the machine learning module, the machine learning module is used to create a regression analysis that generates a decision tree in memory for each characteristic of a plurality of characteristics to administer a settlement strategy for the open WC claim based upon a prediction of how the open WC claim is likely to develop, the decision tree is analyzed for each explicit characteristic that represents a branch in the decision tree, while a separate analysis of the decision tree is run for the implicit characteristics, generating, by the plurality of machine learning modules, a graphical decision tree analysis of a settlement administration strategy for the open WC claim based upon a prediction of how the open WC claim is likely to develop and based upon the regression analysis, wherein the graphical decision tree analysis includes a root node, a first branch, a second branch, a first terminal node, and a second terminal node, the first branch extending between the root node and the first terminal node, the second branch extending between the root node and the second terminal node, the first branch representing a decision of the root node, and the second branch representing an opposing decision of the root node, the first terminal node and the second terminal node each containing a graphical depiction of the amount of the adversely-developed WC claims and the amount of favorably-developed claims of the population of seasoned WC claims, wherein the amount of the adversely-developed WC claims is greater than the favorably-developed claims in the first terminal node, and wherein the amount of the adversely-developed WC claims is less than the favorably-developed claims in the second terminal node, transmitting a display signal to a display device;

displaying, by the display device, the graphical decision tree analysis in response to receiving the display signal.

8. The method for processing according to claim 7, wherein the first predetermined condition is the COW is positive, and the second predetermined condition is the COW is equal to or less than zero.

9. The method for processing according to claim 7, wherein the first predetermined condition is the COW is greater than a first predetermined amount, and the second predetermined condition is the COW is less than a second predetermined amount.

10. The method for processing according to claim 9, wherein the first predetermined amount is different from, and greater than, the second predetermined amount.

11. The method for processing according to claim 10, wherein classifying each seasoned WC claim includes classifying each WC claim in the population as a neutral WC claim when the COW of the seasoned WC claim satisfies a third predetermined condition, and the third predetermined condition is the COW is less than or equal to the first predetermined amount and greater than or equal to the second predetermined amount.

12. The method for processing according to claim 7, further comprising:

periodically compiling a different population of seasoned WC claims of the jurisdiction and repeating the steps of claim 7 using the different population of seasoned WC claims.

13. A non-transitory, computer-readable storage medium bearing computer executable instructions for processing a workers' compensation (WC) claim, the instructions, when executing on one or more computing devices, performing the steps of:

calculating a maximum medical improvement (MMI) based on an analysis of a medical condition of an injured worker stabilizing, a medical treatment plateau and payment patterns, calculating a Cost of Waiting (COW) for a predetermined period of time after an Arrival of a Settlement Opportunity (ASO) of each of a population of seasoned WC claims of a jurisdiction using seasoned WC claim financial data relating to the population of seasoned WC claims and the MMI, training a plurality of machine learning modules with each seasoned WC claim in the population, such that the plurality of machine learning modules classifies the seasoned WC claim as an adversely-developed WC claim when the COW of the seasoned WC claim satisfies a first predetermined condition and as a favorably-developed WC claim when the COW of the seasoned WC claim satisfies a second predetermined condition, classifying, by the plurality of machine learning modules using a presence of the adversely-developing predictor, the open WC claim as likely to develop adversely, conducting, by the plurality of machine learning modules, a regression analysis of the population of seasoned WC claims using seasoned WC claim characteristic data relating to the population of seasoned WC claims to determine a claim characteristic comprising an adversely-developing predictor, the adversely-developing predictor being present in a set of the WC claims of the seasoned population, the set having an adverse subset of adversely-developed WC claims and a favorable subset of favorably-developed WC claims, the adverse subset being greater than the favorable subset, evaluating an open WC claim by comparing corresponding WC claim characteristic data of the open WC claim to the adversely-developing predictor, setting a settlement status indicator of the open WC claim stored in a WC claim database operably arranged with the processor to indicate settlement is sought when the corresponding WC claim characteristic data of the open WC claim matches the adversely-developing predictor, each of the machine learning modules of the plurality of machine learning modules is dedicated to a state or jurisdiction, each of the plurality of machine learning modules having a graphical decision tree created by the machine learning module, the machine learning module is used to create a regression analysis that generates a decision tree in memory for each characteristic of a plurality of characteristics to administer a settlement strategy for the open WC claim based upon a prediction of how the open WC claim is likely to develop, the decision tree is analyzed for each explicit characteristic that represents a branch in the decision tree, while a separate analysis of the decision tree is run for the implicit characteristics, generating, by the plurality of machine learning modules, a graphical decision tree analysis of a settlement administration strategy for the open WC claim based upon a prediction of how the open WC claim is likely to develop and based upon the regression analysis, wherein the graphical decision tree analysis includes a root node, a first branch, a second branch, a first terminal node, and a second terminal node, the first branch extending between the root node and the first terminal node, the second branch extending between the root node and the second terminal node, the first branch representing a decision of the root node, and the second branch representing an opposing decision of the root node, the first terminal node and the second terminal node each containing a graphical depiction of the amount of the adversely-developed WC claims and the amount of favorably-developed claims of the population of seasoned WC claims, wherein the amount of the adversely-developed WC claims is greater than the favorably-developed claims in the first terminal node, and wherein the amount of the adversely-developed WC claims is less than the favorably-developed claims in the second terminal node, transmitting a display signal for a display device configured to display the graphical decision tree analysis in response to receiving the display signal.

14. The non-transitory, computer-readable storage medium according to claim 13, wherein the first predetermined condition is the COW is positive, and the second predetermined condition is the COW is equal to or less than zero.

15. The non-transitory, computer-readable storage medium according to claim 13, wherein the first predetermined condition is the COW is greater than a first predetermined amount, and the second predetermined condition is the COW is less than a second predetermined amount.

16. The system for processing according to claim 1,
wherein the adversely-developing predictor is present in a set of the seasoned WC claims of the population, wherein the set of the seasoned WC claims of the population has an adverse subset of adversely-developed WC claims and a favorable subset of favorably-developed WC claims, and wherein the adverse subset is greater than the favorable subset,
the plurality of machine learning modules including a computer executable code segment configured to conduct the regression analysis to identify the WC claim characteristic comprising the adversely-developing predictor for which the adverse set of WC claims with the claim characteristic have the COW exceeding the predetermined amount and the favorable set of WC claims with the claim characteristic have the COW below the predetermined amount, wherein the adverse set is larger than the favorable set,
the plurality of machine learning modules using a presence of the adversely-developing predictor for generating a favorably-developing predictor likely to develop favorably and a neutral-developing predictor likely to develop neutrally,
the plurality of machine learning modules configured to determine a WC claim characteristic comprising the adversely-developing predictor that more of future WC claims having the adversely-developing predictor will develop adversely than will develop favorably, wherein the WC claim processing application can be configured to target the open WC claims that are likely to develop for settlement,
the plurality of machine learning modules of the WC claim processing application configured to conduct regression analysis that identifies a favorably-developing predictor, wherein the favorably-developing predictor is present in another set of the seasoned WC claims of the population, and wherein this set has an adverse subset of adversely-developed WC claims and a favorable subset of favorably-developed WC claims that is greater than the adverse subset, and
the plurality of machine learning modules configured to receive an updated training set of historical WC claims data related to historical WC claims to update the seasoned WC claims, wherein the plurality of machine learning modules are re-trained with the updated training set of the historical WC claims data and wherein the plurality of machine learning modules are configured to predict, using the historical WC claims data, how an open WC claim is likely to develop based on one or more claim characteristics of the open WC claim.

17. The non-transitory, computer-readable storage medium according to claim 16, wherein classifying each seasoned WC claim includes classifying each WC claim in the population as a neutral WC claim when the COW of the seasoned WC claim satisfies a third predetermined condition, and the third predetermined condition is the COW is less than or equal to the first predetermined amount and greater than or equal to the second predetermined amount.

18. The non-transitory, computer-readable storage medium according to claim 13, wherein the computer executable instructions stored on the tangible computer-readable medium, when executing on one or more computing devices, perform a step of:
periodically compiling a different population of seasoned WC claims of the jurisdiction and repeating the steps of claim 13 using the different population of seasoned WC claims.

* * * * *